United States Patent [19]

Parnes et al.

[11] Patent Number: 4,914,904

[45] Date of Patent: Apr. 10, 1990

[54] OIL COOLER FOR FAN JET ENGINES

[75] Inventors: Marvin J. Parnes, Norwalk; Herman Vogel, Newtown, both of Conn.

[73] Assignee: Avco Corporation, Providence, R.I.

[21] Appl. No.: 269,772

[22] Filed: Nov. 9, 1988

[51] Int. Cl.$^4$ ............................................... F02K 3/04
[52] U.S. Cl. .................... 60/226.1; 60/39.08; 165/168
[58] Field of Search ................ 60/39.83, 39.08, 226.1, 60/267, 262; 165/168, 185

[56] References Cited

U.S. PATENT DOCUMENTS

| | | | |
|---|---|---|---|
| 3,792,586 | 2/1974 | Kasmarik et al. | 60/39.08 |
| 3,830,058 | 8/1974 | Ainsworth | 60/226.1 |
| 4,645,415 | 2/1987 | Hovan et al. | 60/39.83 |
| 4,674,295 | 6/1987 | Curtis, Sr. | 62/304 |
| 4,771,825 | 9/1988 | Chen et al. | 165/151 |
| 4,782,658 | 11/1988 | Perry | 60/39.08 |
| 4,796,430 | 1/1989 | Malaker et al. | 62/6 |

FOREIGN PATENT DOCUMENTS 2041090 9/1980 United Kingdom ............... 60/226.1

Primary Examiner—Donald E. Stout
Attorney, Agent, or Firm—Perman & Green

[57] ABSTRACT

A turbo fan gas turbine engine is disclosed which includes a central engine and a shroud-enclosed fan, the shroud being supported by a plurality of structural struts extending from the central engine to the shroud. A plurality of tubes internal to each strut are provided with fins to increase their effective internal surface areas. Means are provided for connecting the tubes to a source of heated hydrocarbon liquid and for providing a return from the tubes to the source of hydrocarbon liquid, whereby the tubes provide cooling for the liquid. In a preferred embodiment of the invention, the tubes are surrounded by a highly conductive cement to provide support and improved heat transfer between the tubes and the struts.

5 Claims, 2 Drawing Sheets

4,914,904

OIL COOLER FOR FAN JET ENGINES

FIELD OF THE INVENTION

This invention relates to gas turbine engines, and more particularly to an improved means for cooling oil used in gas turbine engines.

BACKGROUND OF THE INVENTION

It is known that lubricating oil in jet engines begins to coke especially in bearing chambers when the temperature exceeds 500° F. This especially becomes a problem when, at engine shut-down, there occurs a soak-back of energy into the bearing chamber which acts to elevate the oil temperature. The prior art has attempted, in various ways, to reduce operating oil temperatures so that, during soak-back, coking does not occur. In addition to employing conventional radiator-type oil coolers, the prior art describes turbines wherein lubricating oil traverses radially through guide vanes of a jet engine to both cool the oil and provide for de-icing of the vanes. (e.g. see U.S. Pat. No. 2,474,258 to Kroon). In U.S. Pat. No. 2,439,447 to Buck et al, a turbine engine is shown in which radial struts communicate with a bearing chamber in the high temperature zone of an engine. The struts supply both oil and cooling air into zones surrounding the bearings.

In fan type, gas turbine engines, it is known (see U.S. Pat. No. 3,830,058 to Ainsworth) to utilize the air foil struts supporting the fan shroud as a path for accessory components (e.g., electrical, air and oil lines). For weight considerations, the shroud struts are hollow and the oil lines placed therein are surrounded by air spaces which provides an insulating barrier between the oil lines and the strut walls. This reduces the effectiveness of the cooling.

Accordingly, it is an object of this invention to provide an improved oil cooling system for a fan-type gas turbine engine.

It is another object of this invention to provide an improved oil cooling system for a fan-type gas turbine engine wherein advantage is taken of portions of the engine which lie in relatively cool air paths.

SUMMARY OF THE INVENTION

A turbo fan gas turbine engine is disclosed which includes a central engine and a shroud-enclosed fan, the shroud being supported by a plurality of structural struts extending from the central engine to the shroud. A plurality of tubes, internal to each strut are provided with means to increase their effective internal surface areas. Means are provided for connecting the tubes to a source of heated hydrocarbon liquid and for providing a return from the tubes to the source of hydrocarbon liquid, whereby the tubes provide cooling for the liquid. In a preferred embodiment of the invention, the tubes are surrounded by a highly conductive cement to provide support and improve heat transfer between the tubes and the struts.

DETAILED DESCRIPTION OF THE INVENTION

Figure 1:
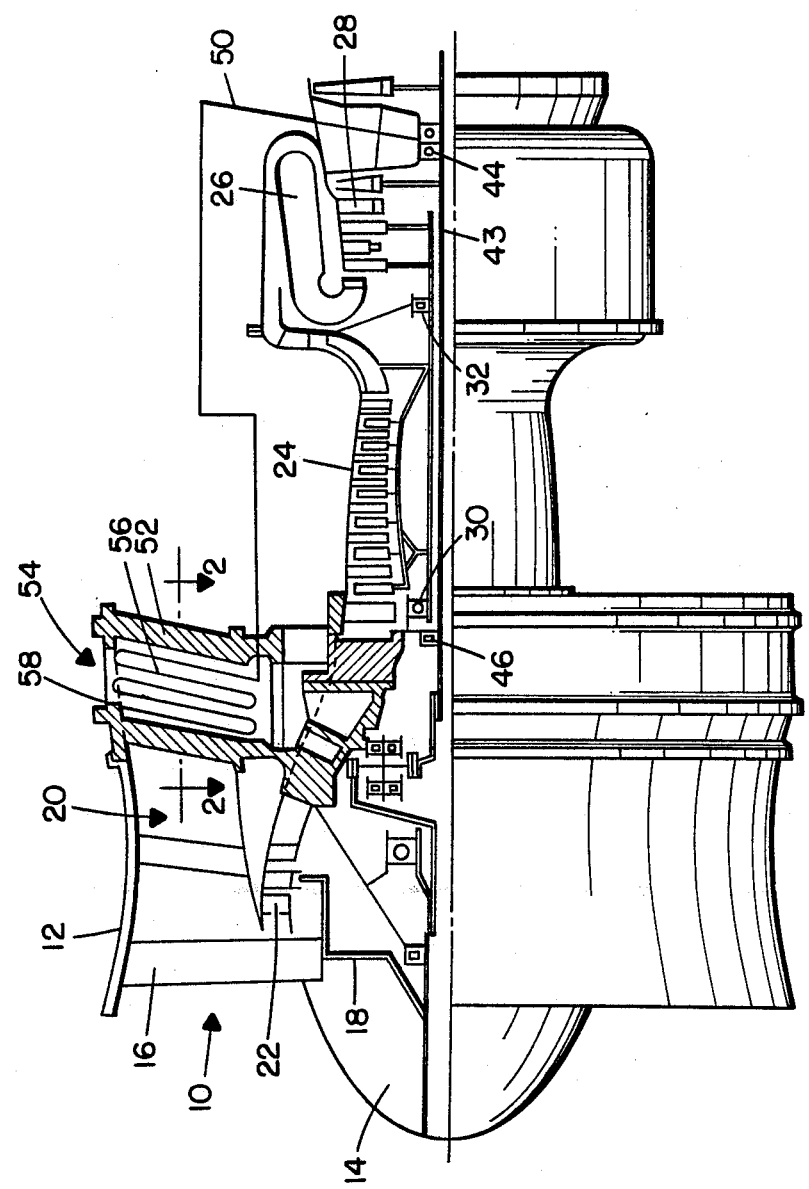
FIG. 1 is a schematic view of a turbo fan gas turbine engine which schematically illustrates the invention, with a partial section taken along line 1—1 in FIG. 3.

Referring to FIG. 1, there is shown a gas turbine engine of the fan type. The engine includes an annular inlet 10 defined by a fan shroud 12 and an inlet spinner 14. A plurality of blades 16 extending from a hub 18 are rotatably mounted to accelerate air through fan discharge duct 20.

A portion of the air accelerated by blades 16 is directed through engine inlet 22 to a compressor rotor 24. From there, the compressed air travels into combustion chamber 26 and then into turbine assembly 28. Compressor rotor 24 is journaled within an annular housing by bearings 30 and 32, while turbine assembly 28, which drives a tubular engine output shaft 43 is journaled by bearings 44 at its aft end and bearings 46 at its forward end. Bearings 44 and the oil which baths them are subjected to high heat stresses from the operation of turbine assembly 28.

As is well known, provisions are made to bathe bearings 44 (and other bearings in the engine) with oil for cooling and lubrication purposes. Oil line 50 connects to bearings 44 and removes the heated oil therefrom, passing it through the outer wall of shroud strut 52. There, it passes into a coil arrangement 54 which comprises a plurality of individual tubes 56 which are interconnected at both their upper and lower ends to provide a continuous cooling path. The cooled oil exits at point 58 and travels to another strut (described below).

Figure 2:
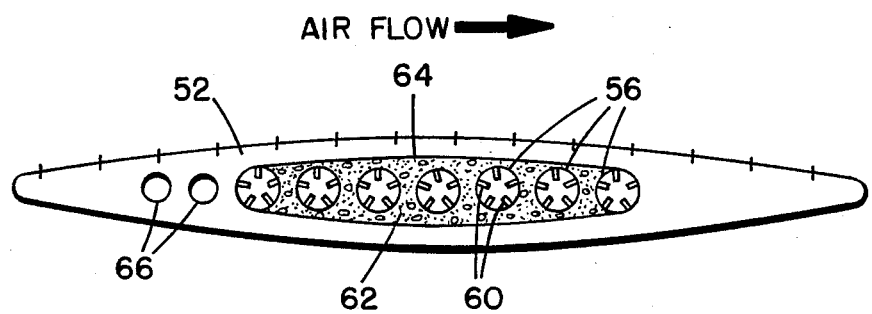
FIG. 2 is a cross section of a shroud-supporting strut showing oil cooling tubes mounted therein.

Referring to FIG. 2, a section of strut 52 taken along line 2—2 in FIG. 1 shows each of tubes 56 as they reside in strut 52. Each tube 56 has provided therein, a plurality internal fins 60 which, in effect, increase the internal surface area for cooling purposes. Each of tubes 56 is held in place by a high thermal conductivity, epoxy based cement 62. An appropriate cement for this purpose is 3M #2214 High Temp aluminum impregnated epoxy available from the 3M Company, Sales Center, Suite 400, 7 Neshaminy Interplex, Trevose, PA 19047.

Tubes 60 and cement 62 are housed within annulis 64 which is normally provided in shroud struts. Cement 62 and internal fins 60 provide for effective cooling since there are no intervening open spaces which separate tubes 60 from the high thermal conductivity of struts 52. This arrangement provides a short thermal pathway between the flowing oil and the external surface of strut 52 which is, in turn, subjected to forced air flow resulting from the action of compressor blades 16 (FIG. 1).

Figure 3:
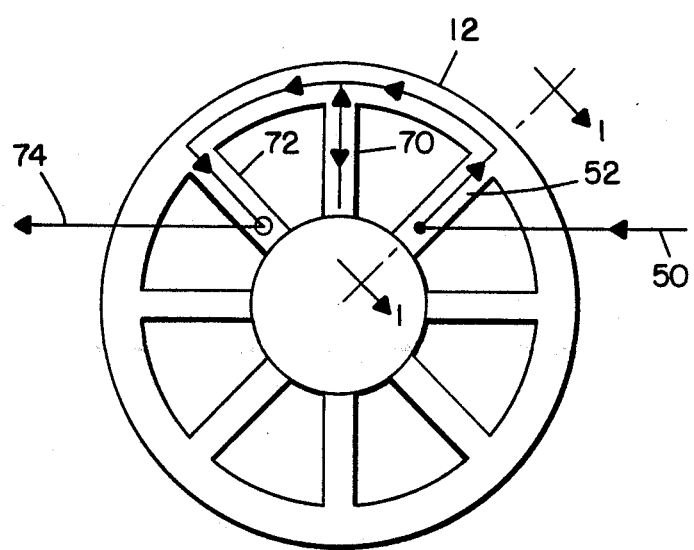
FIG. 3 is a schematic front view of a turbo fan gas turbine engine with the compressor rotor and fan discharge ducts removed to show the shroud struts and oil cooling lines positioned therein.

Referring now to FIG. 3, strut 52 is shown, schematically, as is oil line 50, with the arrows indicating the direction of oil flow therein. As the oil departs from strut 52, it travels along the outer perimeter of shroud 12 where it is passed both into and back out of strut 70. From there, it travels to strut 72 where it is removed by a oil line 74 to an oil pump (not shown) for return to the various bearing assemblies. Obviously, while three struts are shown being used for oil cooling purposes, any number of available struts may be used, depending upon specific cooling requirements.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. In a turbo fan gas turbine engine including a central engine and a shroud enclosed fan, the combination comprising:
   a plurality of structural struts, each said strut extending from said central engine to said shroud;
   a plurality of tubes, internal to each said strut, each said tube being directly thermally connected along its length to said strut by a solid high thermal conductivity pathway;
   means for connecting said tubes to a source of heated hydrocarbon liquid; and
   means for providing a return from said tubes to said source of hydrocarbon liquid whereby said tubes provide cooling for said liquid.

2. The invention as defined in claim 1 wherein said tubes are provided with internal means to increase the effective internal surface area of each said tube.

3. The invention as defined in claim 2 wherein each said tube includes a plurality of internal fins.

4. The invention as defined in claim 2 wherein each said strut is internally hollow and said tubes are resident therein, the combination further comprising:
   a high conductivity cement filling said hollow area of each said strut and intimately contacting said tubes, to thereby immobilize said tubes and provide a direct thermal pathway between said tubes and said strut.

5. The invention as defined in claim 4 wherein tubes, in adjacent radially disposed struts, are connected in series fashion to provide additional cooling capacity.

* * * * *